United States Patent [19]

Babb

[11] 3,998,555
[45] Dec. 21, 1976

[54] COLOR GRADING APPARATUS

[75] Inventor: Raymond E. Babb, Freemont, Calif.

[73] Assignees: Genevieve I. Hanscom; Genevieve I. Hanscom, Robert Magnuson and Lois J. Thomson, as trustees of the estate of Roy M. Magnuson, all of San Jose, Calif.; part interest to each

[22] Filed: Dec. 9, 1974

[21] Appl. No.: 530,961

Related U.S. Application Data

[63] Continuation of Ser. No. 407,641, Oct. 18, 1973, abandoned, which is a continuation-in-part of Ser. No. 205,792, Dec. 8, 1971, abandoned.

[52] U.S. Cl. .............................. 356/178; 250/226; 209/111.6
[51] Int. Cl.[2] .................... G01M 21/22; B07C 5/10
[58] Field of Search ................. 356/178, 176, 177; 250/226; 209/111.5, 111.6

[56] References Cited

UNITED STATES PATENTS

| | | | |
|---|---|---|---|
| 2,938,424 | 5/1960 | Herriott | 356/178 |
| 3,016,788 | 1/1962 | Smith | 250/226 X |
| 3,867,039 | 2/1975 | Nelson | 356/178 |

OTHER PUBLICATIONS

Ward, *American Dyestuff Reporter*, vol. 55, No. 23, pp. 55–61.
Olsen, *Control Engineering*, Nov. 1965, pp. 90–93.

Primary Examiner—Robert J. Webster
Attorney, Agent, or Firm—Gerald L. Moore

[57] ABSTRACT

Apparatus for color grading of liquid or solid products, such as fruits, vegetables, etc., said apparatus employs an electronic device which measures the ratio of reflectance of the products at two separated parts of the light spectrum. The device views either a calibration surface or the product being tested so that between tests the operator can see whether or not the instrument is holding its calibration and adjust it if necessary.

4 Claims, 4 Drawing Figures

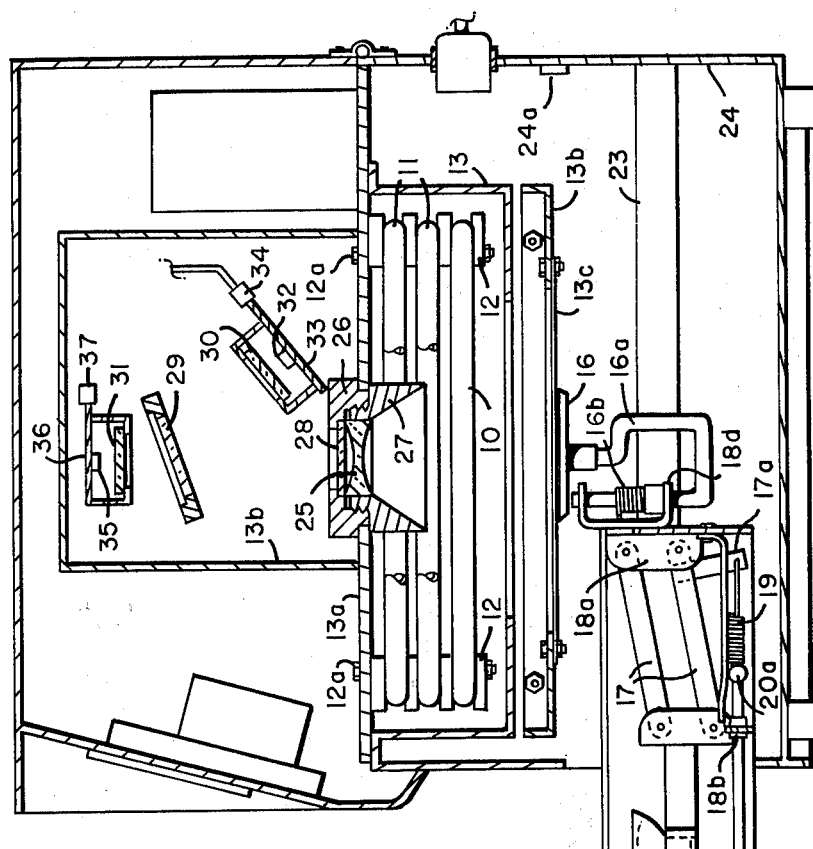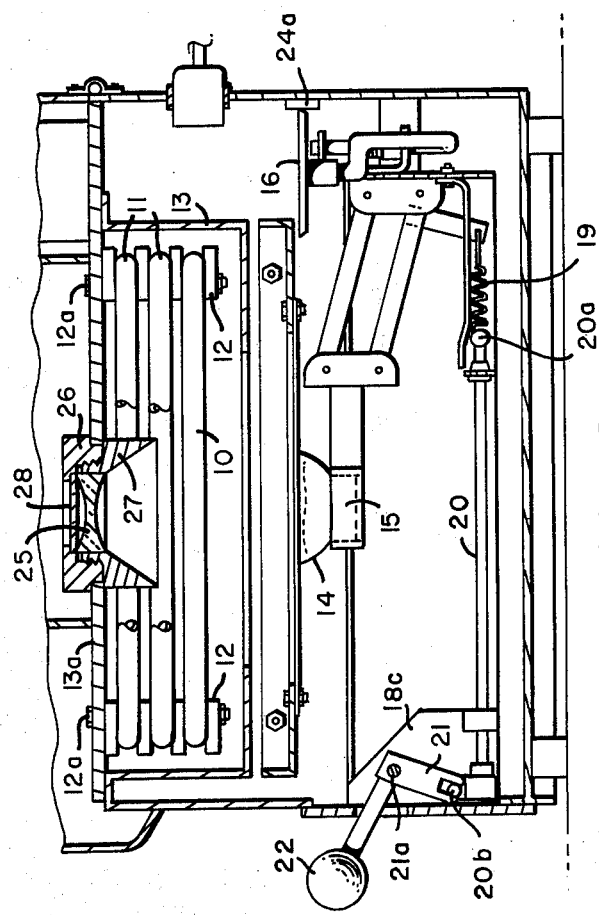

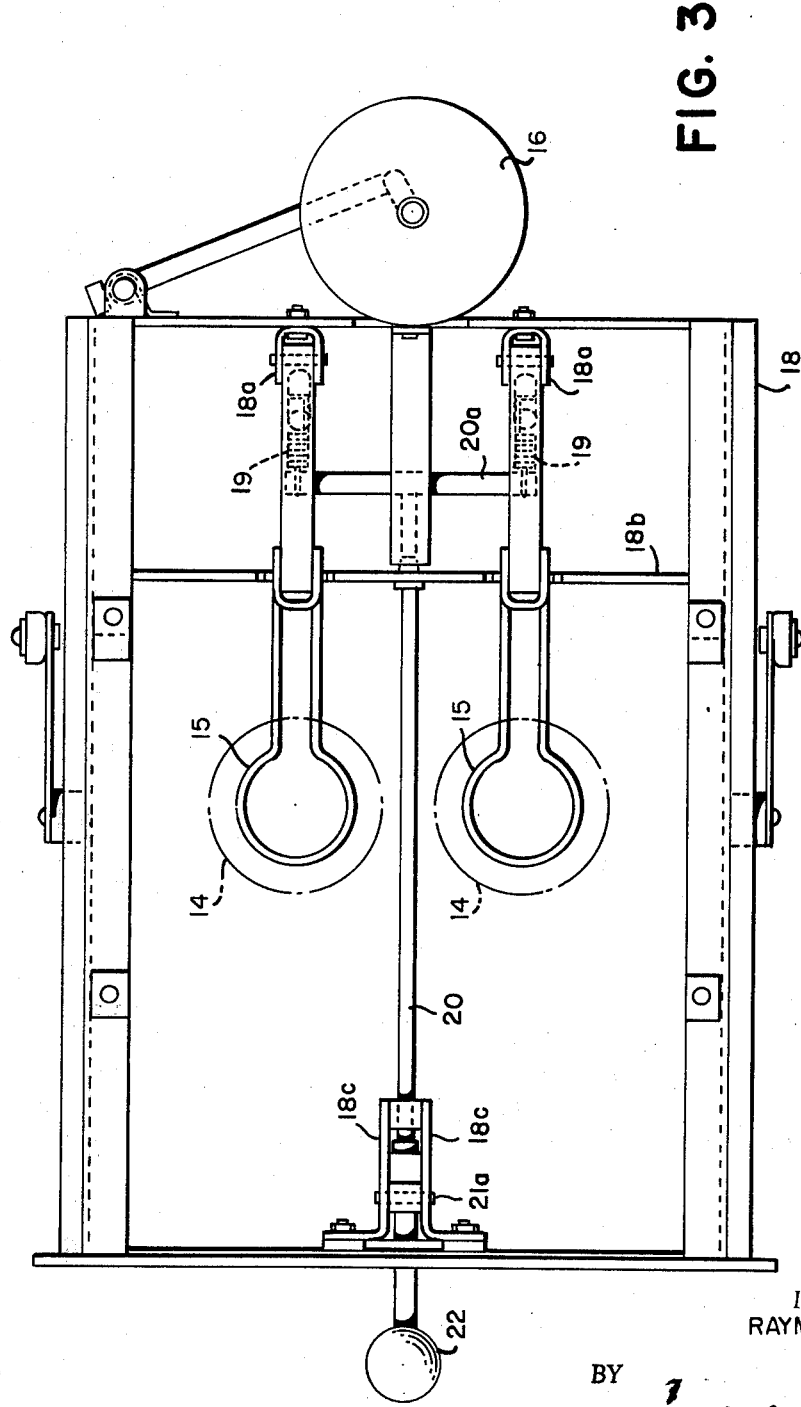

COLOR GRADING APPARATUS

This application is a continuation of application Ser. No. 407,641, filed Oct. 18, 1973, now abandoned, which was a continuation-in-part of application Ser. No. 205,792, filed Dec. 8, 1971 and now abandoned.

This invention relates to an electronic device for measuring the ratio of reflectance at spaced parts of the spectrum of liquid or solid products.

An object of this invention is to provide an improved device for measuring the ratio of reflectance of liquid or solid products which is easy to operate and may be used efficiently by unskilled labor.

Another object of this invention is to provide an improved color grading device employing light sensitive means that views either a calibration surface or a product surface whereby the device provides visual indications or readings of the calibration thereof before and after its use in grading a product.

Another object of this invention is to provide an improved color grading device with an optical system that views a relatively large area in which the product to be graded is positioned and transmits the light reflected from the product to a dichroic filter which allows the red light to pass therethrough to a sharp cut off interference red filter and reflects the green light to a sharp cut off green filter. The red and green lights passed by these filters are supplied to an electronic circuit which indicates the ratio between the red and green light reflected from the product.

Other and further objects of this invention will be apparent to those skilled in the art to which it relates from the following specification, claims and drawing.

This invention is an improvement over the method and apparatus for color grading disclosed and claimed in U.S. Pat. No. 3,016,788 issued Jan. 16, 1962. In accordance with the present invention there is provided a color grading device for use in the grading of various products which may be used by unskilled labor. This device is provided with a cabinet having a slidable drawer with means for supporting the product to be graded. This drawer is slidable in and out of the cabinet and when the drawer is in its "out" position a calibration surface is automatically positioned in the viewing field of the optical system so that calibration of the instrument is indicated between the times product measurements are made. When the drawer is moved into the cabinet the calibration surface is automatically moved out of viewing position and the product positioned on the supporting means is moved into and up to the viewing horizon of the optical system. The product is illuminated by two light sources which supply the red and green light that is reflected from the product surface into the optical system. The optical system employs a double concave lens which receives a light reflected from the product and transmits this light to dichroic filter which passes the red light and reflects the green. The red light is received by a sharp cut off interference filter that is positioned in front of a light sensitive cell or photodiode that is connected to one channel of an electronic apparatus and the green light is reflected by the dichroic filter to a sharp cut off green filter that is positioned in front of a light sensitive cell or photodiode that is connected to another channel of an electronic apparatus. The electronic apparatus is adjusted when the calibration surface is in the field of view of the optical system so that the indicating instrument of the apparatus indicates a certain desired ratio of red to green light for a given product. The given product is then positioned on the supporting means in the movable drawer of the apparatus and is brought into the field of view of the optical system to determine how close its color is to the desired ratio. The indicating device of the apparatus indicates the ratio of the red to green light reflected by the given product and indicates whether this ratio is within the desired range for the given product.

Heretofore various abridged spectrophotometers and light reflection sensing apparatus such as described in the November, 1955 issue of Control Engineering magazine and U.S. Pat. No. 2,938,424, respectively, have been proposed for measuring the ratio of two colors reflected from a product for various purposes. However, these devices require various manual adjustments during use which must be made by trained persons. In the present invention I have provided an apparatus constructed so that it may be operated for color grading various products by persons receiving only brief instruction since the color grading computations are performed automatically by the apparatus. Thus, for example, in the present apparatus the electrical circuits are provided with devices which determine the ratio of the green light reflection to the red light reflection automatically. This is possible by the use of an analog divider which enables all ratio adjustments to be made when instrument is manufactured so it can be used in the field without further adjustment of the ratio of the green to red signals. Thereafter the only adjustment necessary when the instrument is used is to check the meter reading each time the sample drawer is withdrawn from the instrument.

Further details and features of this invention will be set forth in the following specification, claims and drawing in which, briefly:

FIG. 1 is a vertical sectional view taken through an embodiment of this apparatus showing the optical system and showing the product drawer in its "out" position, and the calibration surface in the viewing field of the optical system;

FIG. 2 is a sectional view of the lower part of this apparatus as shown in FIG. 1 and showing the drawer of the apparatus closed and the product to be graded raised to a predetermined position in the field of view of the optical system;

FIG. 3 is a plan view of the product supporting means and the calibration surface which are carried by the movable drawer of this apparatus.

Figure 4:
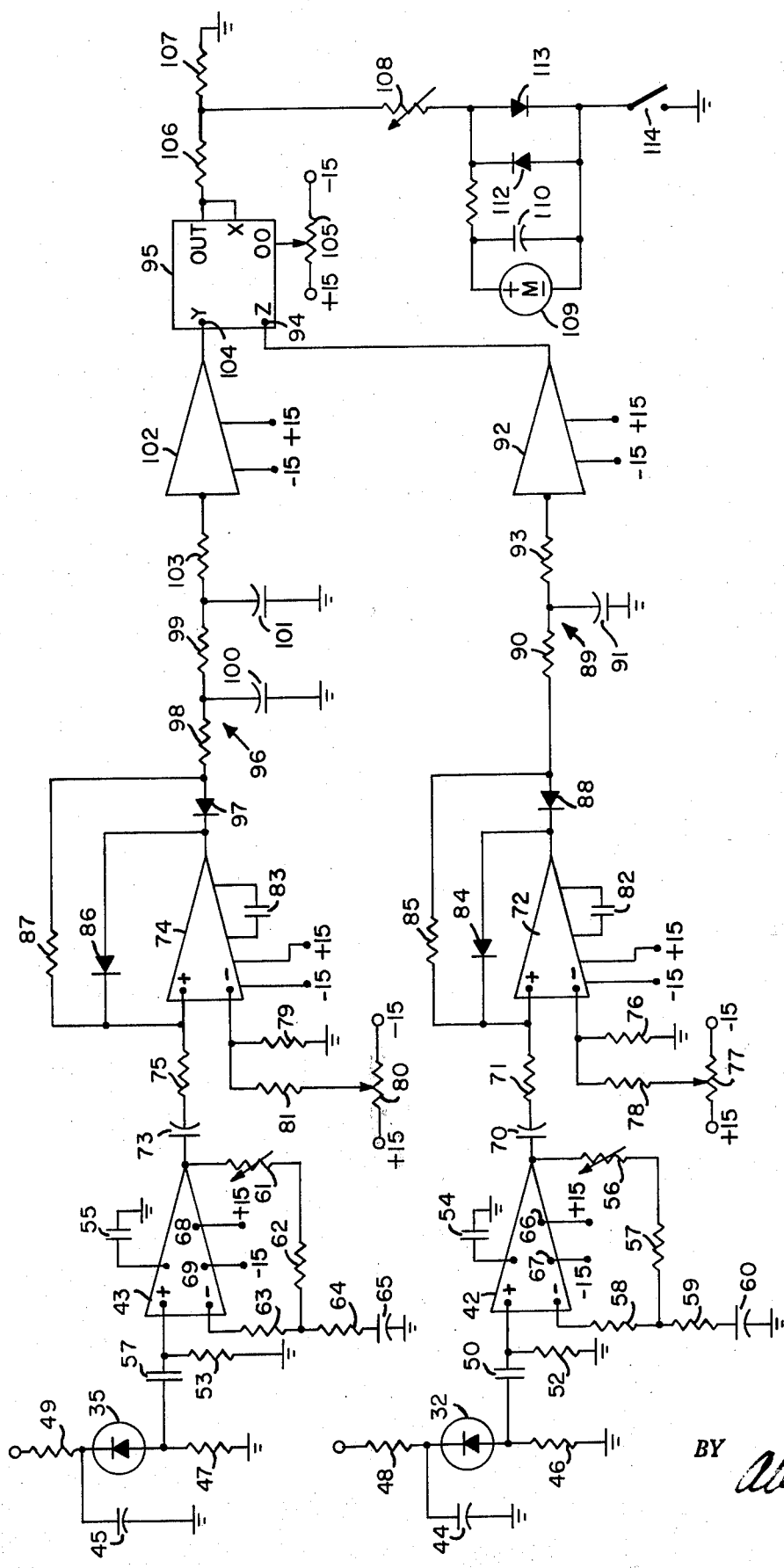
FIG. 4 is a schematic wiring diagram of the electronic circuit employed in this apparatus for indicating the ratio of the red and green light reflected by the product being graded.

Referring to the drawing in detail reference numerals 10 and 11 designate a neon tube and mercury vapor tubes, respectively, which comprises the light source of this device. The tubes 10 and 11 are of the gaseous electric discharge type which are energized by high voltage source such as is described in my application Ser. No. 163,294 filed July 16, 1971, now U.S. Pat. No. 3,744,919 issued July 10, 1973. These tubes are supported by the brackets 12 in the housing 13 and these brackets are attached to the top 13a of the housing by suitable bolts 12a. The product to be color graded is positioned on the sample supports 15 so that the flat cut surfaces thereof are uppermost and exposed to the light generated by the light source. Two product supporting members 15 are provided to this apparatus as shown in FIG. 3. Each of these members is attached to arms 17 which are pivotally attached to the bracket 18a which is attached to the back wall of the drawer 18. A lever 17a is attached to the lower one of the arms 17 in each case and a spring 19 is attached to this lever. There are two springs 19 since there are two sets of arms 17. The springs 19 are attached to the rod 20a which is attached to the rod 20 that is slidably supported by cross member 18b provided to the drawer and also by the brackets 18c which are attached to the front of the drawer. Rod 20 is provided with a pin 20b that is slidably engageable by the lever 21 which is pivotally supported between the brackets 18c by the pin 21a. Lever 21 is attached to the handle 22 which extends out of the front wall of the drawer 18. Suitable rails such as rail 23 are attached to the inner sides of the cabinet 24 on opposite sides of the drawer 18 and these rails are engaged by suitable channels attached to the opposite sides of the drawer 18 to provide sliding support for the drawer.

When the drawer 18 is moved out to the position shown in FIG. 1 so that the product 14 may be loaded on the supports 15, those supports are in their lower positions. At the same time the calibrating surface 16 which is supported by the member 16a on the bracket 18d that is attached to the back wall of the drawer 18 is swung into viewing position directly under the lens 25 of the optical system and below the wire 13c which is supported by the panel 13b that is attached to the walls of the cabinet 24. Member 16a which supports the calibrating surface 16 is spring-biased by the coil spring 16b so that calibrating surface 16 is rotated into its viewing position when the drawer 18 is pulled out of the cabinet as shown in FIG. 1. On the other hand this calibrating surface is rotated into the position shown in FIG. 2 when the drawer 18 is pushed all the way into the cabinet, since in this position the calibrating surface 16 is in engagement with the bumper 24a attached to the rear wall of the cabinet.

After the drawer 18 is pushed all the way into the cabinet the handle 22 is moved manually into its elevated position as shown in FIG. 2, and the product 14 is elevated so that its top surface is in engagement with the wire 13c. Thus, different samples of the product will always be at the same elevation in the apparatus during color grading thereof. Elevating the products so that the top surface thereof engages the wire 13c is accomplished by moving the handle 22 to its upper position so that the rod 20 and springs 19 pull on levers 17a and swing the arms 17 upward.

Light is reflected by the product 14 toward the bottom surface of the double concave lens 25 which is supported on the top panel 13a of the housing by the lens mount which comprises members 26 and 27. This mount also supports the long wavelength trimmer filter 28 above the double concave lens 25. Lens 25 views an area sufficient to cover both of the products 14 positioned below it. These products may be the opposite halves of a ripe tomato. On the other hand a dish containing tomato juice may be supported on both of the members 15 so that the juice is viewed by the lens.

Filter 28 is of a type having transmittance of 80% or greater in the light spectrum from 4300 angstroms to 6420 angstroms, 65% minimum transmittance at 4358 angstroms, 80% or greater transmittance at 6402 angstroms, 50% at 6900 angstroms, and 1% or less transmittance in the range from 7500 angstroms to 9500 angstroms. Such a filter is manufactured by Heliotek of Sylmar, California.

Light reflected by the product 14 to the lens 25 is collimated and passed through the long wave trimmer filter 28 upward to the dichroic filter 29. The dichroic filter 29 has a transmission capability greater than 80% at the light wavelength of 6402 angstroms, and it has a reflectance capability greater than 95% at the light wave length of 5460 angstroms. This filter is positioned at an angle of about 20° with respect to the horizontal axis and at an angle of about 70° with respect to the direction of the collimated light rays projected to it from the lens 25. The dichroic filter is manufactured by Torr Optical Laboratories of Inglewood, California.

Dichroic filter 29 reflects the green light to the green filter 30 and it transmits the red light to red filter 31. Green filter 30 is of the interference type having a center wavelength of 5430 angstroms plus or minus 20 angstroms, and the band of the light transmitted thereby is 180 angstroms plus or minus 20 angstroms at 50% peak transmittance. Its transmittance characteristic is 70% or greater at 5400 angstroms and 5462 angstroms, 1% or less in the light range from 3500 to 5000 angstroms and in the light range from 5820 angstroms to 7500 angstroms. Red filter 31 is of the interference type and its center wavelength is 6402 angstroms with a band width of 90 angstroms plus or minus 15 angstroms at 50% of peak transmittance. Its transmittance characteristic is 70% or greater at peak, 13% or less at 6330 angstroms, 5% or less at 6300 angstroms and 1% or less from 3500 angstroms to 6000 angstroms and from 6700 angstroms to 7500 angstroms. Green and red filters having the above characteristics are manufactured by Heliotek of Sylmar, California.

The green light is transmitted by the filter 30 to the photodiode 32 which is mounted on the photoamplifier board 33 that is mounted on the plug in socket 34. Red light is transmitted by the filter 31 to the photodiode 35 that is mounted on the photoamplifier board 36 which is supported by the plug in socket 37. Sockets 34 and 35 are supported on the housing 13b by suitable brackets. The outputs of the photoamplifiers are connected to the input of the ratio computer 38, the photodiodes and photoamplifiers and ratio computer are connected as shown in the wiring diagram of FIG. 4.

The light sensitive cell 32 and the operational amplifier 42 shown in FIG. 4 are positioned on the amplifier board 33 as shown in FIG. 1, and light sensitive cell 35 and operational amplifier 43 are positioned on the amplifier board 36. Light sensitive cell 32 is sensitive to the green light and this cell together with the amplifier channel connected thereto will be referred to as the green channel, while light sensitive cell 35 is sensitive to the red light and this cell together with the amplifier channel connected thereto will be referred to as the red channel. Filter capacitors 44 and 45 are connected across the cells 32 and 35, respectively, and the resistors 46 and 47, respectively. Additional resistors 48 and 49 are connected between the cells 32 and 35, respectively, and the positive 15 volt supply is connected to the upper terminals of these resistors. Cells 32 and 35 are coupled to the inputs of operational amplifiers 42 and 43, respectively, through capacitors 50 and 51, respectively, and resistors 52 and 53 are provided between these respective inputs of amplifiers 42 and 43 and ground. Frequency compensating capacitors 54 and 55 are connected to amplifiers 42 and 43, respectively, to stabilize these amplifiers. Amplifier 42 is provided with a gain control circuit including the variable resistor 56 which is connected in series with resistors 57 and 58 to provide circuit between the output and the negative input terminal of this amplifier and an additional resistor 59 is provided between the common terminal between resistors 57 and 58 and the upper terminal of the large by-pass capacitor 60, the lower terminal of which is connected to ground. Amplifier 43 is provided with a similar gain control circuit which includes the variable resistor 61 and fixed resistors 62 and 63, all of which are connected in series between the output of amplifier 43 and the negative input terminal thereof. The upper terminal of resistor 64 is connected to the common terminal of resistors 62 and 63 and the lower terminal of resistor 64 is connected to the upper terminal of the large by-pass capacitor 65, the lower terminal of which is connected to ground. Amplifiers 42 and 43 are also provided with terminals 66 and 68 to which the positive 15 volt supply is connected and these amplifiers are also provided with terminals 67 and 69, respectively, to which the negative 15 volt supply is connected. The output of amplifier 42 is connected to one side of the AC coupling capacitor 70, and the other side of this capacitor is connected to the positive input terminal of operational amplifier 72 through resistor 71. Likewise, the output of amplifier 43 is connected to one side of the AC coupling capacitor 73 and the other side of this capacitor is connected to the positive terminal of operational amplifier 74 through resistor 75. The negative input terminal of amplifier 72 is connected to ground through resistor 76 and in addition this negative terminal is connected to the variable contact of zero trimming resistor 77 through resistor 78. One side of resistor 77 is connected to the positive 15 volt supply and the other side is connected to the negative 15 volt supply so that the variable contact of this resistor connected to resistor 78 controls the trimming bias voltage applied to the negative input terminal of amplifier 72. Amplifier 74 is provided with a similar output trimming circuit which is connected to the negative input terminal of this amplifier. Resistor 79 is connected between the negative input terminal of amplifier 74 and ground and this terminal is also connected to the variable contact of resistor 80 through resistor 81. Resistor 80 is connected across the 15 volt supply the same as resistor 77. Amplifiers 72 and 74 are also provided with frequency compensating capacitors 82 and 83, respectively, connected to terminals thereof, and these amplifiers are also provided with terminals to which the minus 15 volt and plus 15 volt supplies are connected as shown in the drawing. In addition diodes 84 and 86 are connected between the outputs and inputs of amplifiers of 72 and 74, respectively, and gain determining resistors 85 and 87 are also connected between the outputs and inputs of amplifiers 72 and 74, respectively. Diode 88 is connected between the output of amplifier 72 and the input of integrating circuit 89 which includes the resistor 90 and the capacitor 91. The common connection between this resistor and capacitor is connected to the input of the voltage follower operational amplifier 92 through resistor 93. The output of amplifier 92 is connected to the terminal 94 of the analog divider 95. The output of amplifier 74 is connected to the integrating circuit 96 through the diode 97. Integrating circuit 96 is provided with resistors 98 and 99 and capacitors 100 and 101, as shown in the drawing and the output of this integrating circuit is connected to the input of the voltage follower operational amplifier 102 through resistor 103. The output of amplifier 102 is connected to terminal 104 of the analog divider 95. Both amplifiers 92 and 102 are provided with additional terminals to which the minus and plus terminals of a 15 volts supply are connected.

The analog divider 95 comprises the multiplier 95$a$ that includes the transistors 95$b$ and 95$c$, the collectors of which are connected together to the emitter of transistor 95$d$. The collector of transistor 95$d$ is connected to the negative terminal of the source of current supply and the base thereof is connected to the input terminal Y of the analog divider to receive the "green" signal from the operational amplifier 102. The base of transistor 95$b$ is connected to ground and the emitter of this transistor is connected to the lower terminal of resistor 95$f$ and to the negative input terminal of the operational amplifier 95$g$ which is connected as an inverter. The emitter of transistor 95$c$ is connected to the lower terminal of resistor 95$b$ and also to the positive input terminal of operational amplifier 95$g$. The upper terminals of resistors 95$f$ and 95$h$ are connected together to the positive terminal of the transistor current supply.

Transistors 95$b$, 95$c$ and 95$d$ and resistors 95$f$ and 95$h$ form a differential amplifier and by controlling the emitter current of transistors 95$d$ the gain of the amplifier may be varied. The base of transistor 95$c$ is connected to the terminal X of the analog divider through the resistor 95$i$, hence the output of the amplifier is proportional to the input voltage applied to terminal X times a function of the emitter current of transistor 95$d$. Operational amplifier 95$g$ scales the differential signals at the collectors of transistors 95$b$ and 95$c$ and produces an output referenced to ground since the positive input terminal of this operational amplifier is connected to ground through resistor 95$j$. The output of operational amplifier 95$g$ is connected to the positive input terminal of operational amplifier 95$l$ through the summing resistor 95$k$. Another summing resistor 95$m$ is connected between the positive input terminal of operational amplifier 95$l$ and the input terminal Z of the analog divider which is supplied the "red" signal from operational amplifier 92. The relationship at the amplifiers summing junction 95$n$ is: (output) $Y/10 = Z$ which gives the output equal to $10Z/Y$ supplied at the output terminal 95$p$ of the analog divider.

The analog divider is also provided with a trimmer circuit which includes a resistor 105 having the respective terminals thereof connected to the minus and to the plus terminals of the 15 volt supply, and the variable contact of this resistor is connected to the trimming terminal of the analog divider. A regulated 15 volt direct current supply such as is disclosed in my U.S. Pat. No. 3,744,919, is provided for use in conjunction with this apparatus wherever a 15 volt supply is indicated.

The output of the analog divider is connected to the resistors 106 and 107 which form a voltage divider. The common terminal between the resistors 106 and 107 of the voltage divider is connected to the meter circuit through resistor 108 which is variable and which is used to adjust the meter scale as will be described hereinafter. The microammeter 109 is connector across the large capacitor 110 and the signal is fed to the meter through resistor 111. Meter protecting diodes 112 and 113 are connected across the input to the meter and a meter switch 114 is connected between these diodes and ground.

In preparing this apparatus for use the controls of the amplifiers thereof are first adjusted to provide the desired signal gain when no signal output is provided by the photodiodes 32 and 35. The adjustable contact of the zero trim potentiometer 77 is adjusted so that zero voltage is provided for the green signl at terminal 94 of the analog divider 95. Likewise, with no signal output from the photodiode 35, the zero trim adjustable contact of potentiometer 80 is adjusted so that zero voltage is provided at the red signal terminal 104 of the analog divider 95. The amplifiers are then adjusted to provide the desired ratio between the red and green signals for a given product. For this purpose the calibration disk 16 shown in FIG. 1, corresponding to the given product is moved into view under the lens 25 so that light reflected from this disk is transmitted to the light sensitive cells or photodiodes 32 and 35. Cell 32 receives the green signal and cell 35 receives the red signal. The green signal is usually much weaker than the red signal and for this reason amplifiers 42, 72 and 92 are adjusted to amplify the green signal twice as much as amplifiers 43, 74 and 102 amplify the red signal. This is desirable because the analog divider 95 functions more efficiently if the signal supplied to terminal 94 is not too weak as compared to the signal supplied to terminal 104. Compensation for this increased green signal amplification is provided in the voltage divider 106–107 that is connected to the output of the analog divider. In this voltage divider the output signal is divided in half before it is supplied to the meter circuit through the adjustable resistor 108. Resistor 108 is adjusted so that the meter reading is brought to the desired part of the scale of meter 109 when the calibration disk 16 is being viewed in the optical system shown in FIG. 1. The point on the scale of the meter 109 to which the needle thereof is deflected during calibration is the indication of the ratio between the red and green signals desired for the particular product for which the calibration disk 16 was provided. The ratios of the red to green signals of the particular product being graded should then be within a certain range of this calibration point. Samples of the product to be graded are placed on the supports 15. These supports are moved into view out of the cabinet of this apparatus during the calibration procedure described. Thus, in order to do this the operator must pull the drawer or carriage to which the supports are attached out of the cabinet and while the carriage is being moved out calibration disk 16 is moved into view of the optical system and the light sensitive photodiodes receive light reflected from the disk 16. The operator may accordingly view the meter 109 after each test of a product to see if the calibration of this instrument was changed. If the calibration has changed the operator adjusts variable resistor 56 which controls the gain of amplifier 42 to bring the calibration reading of meter 109 to the desired point. The control knob for resistor 56 is positioned on the outside of the cabinet so that it is accessible for this purpose. The operator then loads the next samples of the product to be graded on the supports 15 and shifts these supports and the product carried thereby into the cabinet so that the samples of the product are brought into view of the optical system, and light is reflected therefrom to the photodiodes 32 and 35. These photodiodes supply the red and green signals, respectively, to the amplifying channels of this apparatus in the form of alternating voltages which amplifiers 42 and 43 amplify and supply it to the inputs of the amplifier 72 and 74, respectively, which function also as inverters. The outputs of amplifiers 72 and 74 are rectified and supplied to the integrating circuits 89 and 96, respectively, which together with the voltage follower amplifiers 92 and 102 and analog divider 95 comprise the ratio computer of this apparatus. The output of the ratio computer is taken off of the voltage divider 106–107 and supplied to the meter circuit as previously described.

While I have shown and described a preferred form of the invention it will be apparent that the invention is capable of variation and modification from the form shown so that the scope thereof should be limited only by the scope of the claims appended hereto.

What I claim is:

1. A system for measuring the ratio of light reflectance of various products at two spaced areas of the light spectrum, comprising the combination of:
   means supporting the product to be measured;
   light source means for directing light including the two areas of the light spectrum onto the product;
   a pair of first and second light sensitive cells for generating light responsive signals in response to the light received;
   first means to direct light reflected from the product in a first area of the spectrum onto a first light sensitive cell;
   second means to direct light reflected from the product in a second area of the spectrum onto a second light sensitive cell;
   first and second amplifiers receiving the light responsive signals from the first and second light sensitive cells, respectively, and for generating output signals responsive thereto:
   means to receive and compare the output signals from the amplifiers and generate a signal in response to the ratio of the signals;
   readout means for indicating the ratio of the signals;
   a calibrating disc having a known ratio of light reflectance in the first and second areas of the spectrum positioned to receive light from said light source means and reflect light to the first and second means at preselected time periods onto the light sensitive cells; and
   means to adjust the level of amplification of one of the first and second amplifiers for adjusting the readout to said known ratio reading during said preselected time periods.

2. A system for measuring the ratio of light reflectance of various products at spaced areas of the light spectrum as defined in claim 1 including means for moving the calibrating disc into the position to reflect light whenever a product is removed from the support means.

3. A system for measuring the ratio of light reflectance of various products at spaced areas of the light spectrum as defined in claim 1 including dichroic filters in said first and second means for passing light in the first and second light spectrum areas respectively.

4. A system for measuring the ratio of light reflectance of various products at spaced areas of the light spectrum as definedd in claim 1 including means to adjust the level of the signal responsive to the ratio of the output signals.

* * * * *